United States Patent [19]

Hargrove et al.

[11] 4,035,261

[45] July 12, 1977

[54] WATER TREATMENT OF HYDRODESULFURIZATION CATALYST TO IMPROVE ITS MICROPOROSITY

[75] Inventors: John David Hargrove, Aldershot; Graham Keith Hilder, Addlestone, both of England

[73] Assignee: The British Petroleum Company Limited, London, England

[21] Appl. No.: 631,459

[22] Filed: Nov. 12, 1975

[30] Foreign Application Priority Data

Nov. 25, 1974  United Kingdom ............ 50867/74

[51] Int. Cl.² ................... B01J 29/6; B01J 23/84
[52] U.S. Cl. ..................... 252/455 R; 252/458; 252/465; 208/216
[58] Field of Search ....... 252/458, 465, 420, 455 R

[56] References Cited

U.S. PATENT DOCUMENTS

| | | | |
|---|---|---|---|
| 2,698,305 | 12/1954 | Plank et al. | 252/420 |
| 3,493,517 | 2/1970 | Jaffe | 252/458 |
| 3,836,594 | 9/1974 | Sampson et al. | 252/420 |
| 3,846,341 | 11/1974 | Courty | 252/465 |
| 3,900,427 | 8/1975 | Riley et al. | 252/465 |
| 3,920,581 | 11/1975 | Hilfman et al. | 252/465 |

*Primary Examiner*—George Crasanakis
*Attorney, Agent, or Firm*—Morgan, Finnegan, Pine, Foley & Lee

[57] ABSTRACT

Desulphurization catalysts particularly CoMo are improved by treating with water free from added salts. The water washing improves the pore size distribution of the catalyst.

3 Claims, 5 Drawing Figures

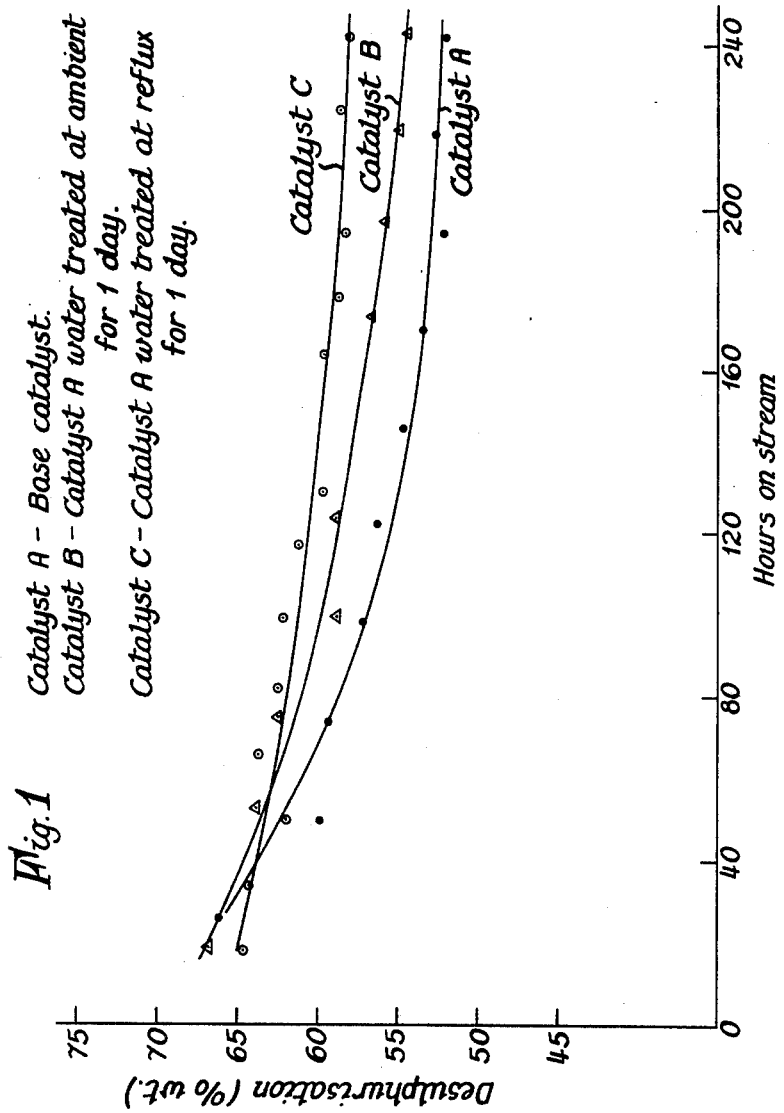

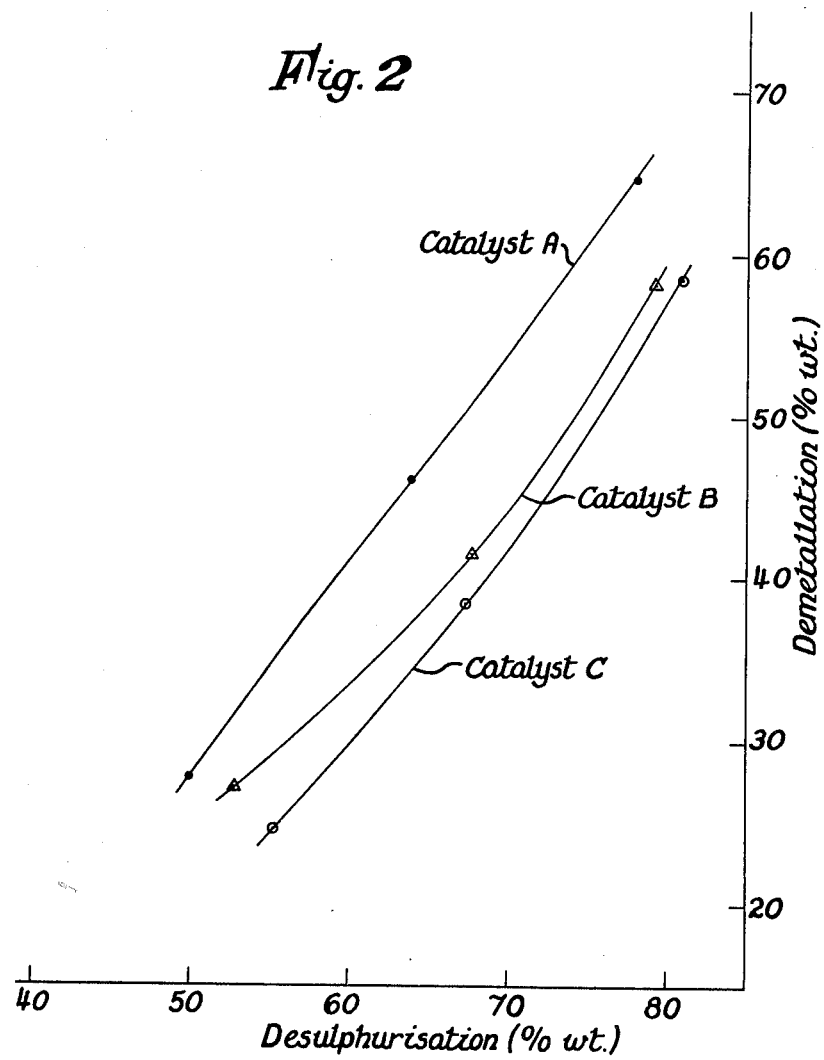

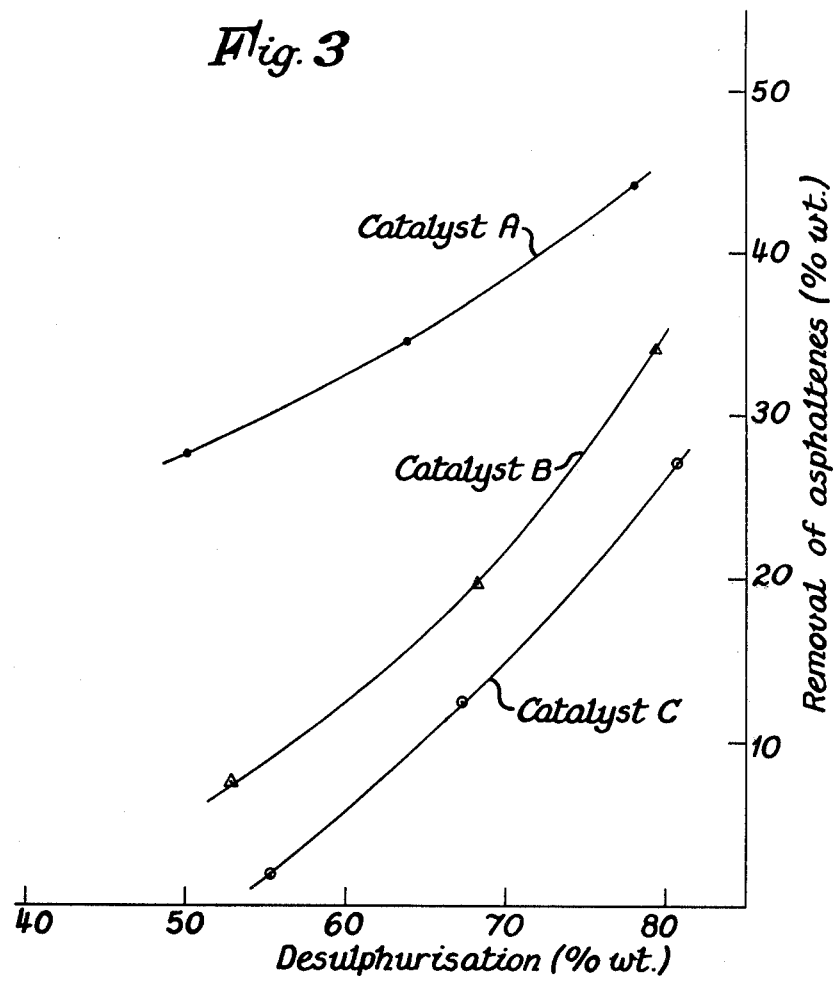

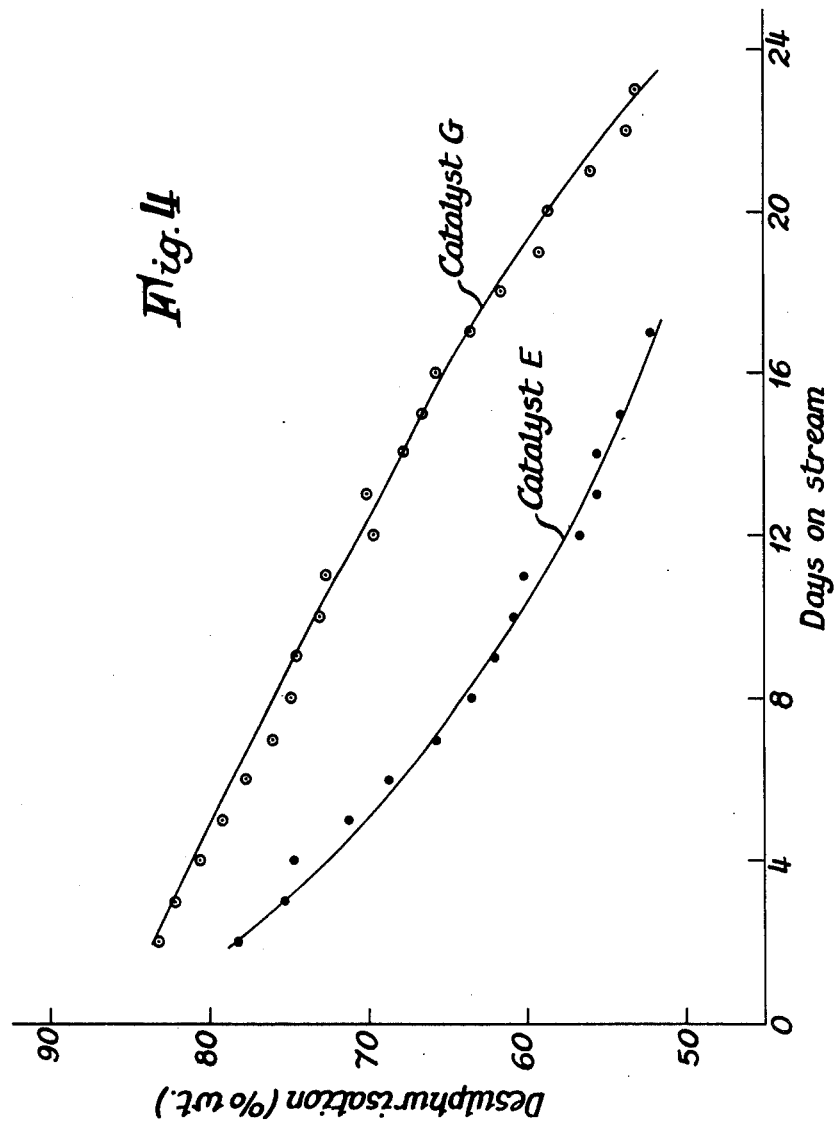

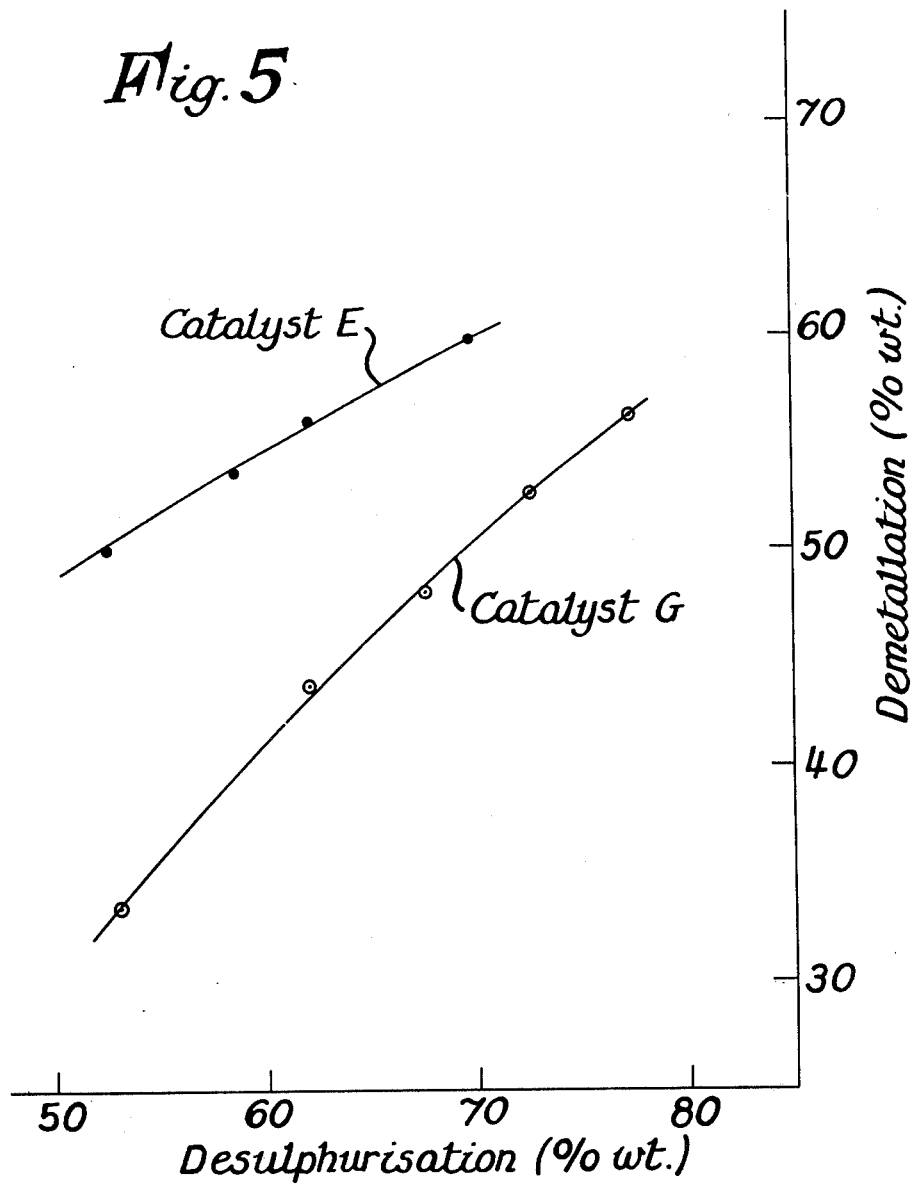

WATER TREATMENT OF HYDRODESULFURIZATION CATALYST TO IMPROVE ITS MICROPOROSITY

This invention relates to the preparation of catalysts suitable for the hydrodesulphurisation of hydrogen fractions containing sulphur compounds, particularly petroleum fractions, and to their use.

The hydro-catalytic desulphurisation, or hydrofining, of petroleum fractions is a well established process. The catalysts used comprise a Group VIA metal compound (i.e., a compound of molybdenum, tungsten or chromium, particularly the first two) and an iron group metal compound (i.e., a compound of nickel, cobalt or iron, particularly the first two) on a refractory support. The Group VIA metal may be present in an amount of 5–25% wt expressed as metal and the iron group metal in an amount of 1–10% wt expressed as metal. Until recently the main interest has been in the desulphurisation of distillate petroleum fractions, but the current emphasis is very much on the desulphurisation of residues. Residues not only contain larger quantities of sulphur and nitrogen compounds than distillate fractions, but they also contain asphaltenes and, frequently, metal compounds, particularly compounds of vanadium and nickel, and it is accepted that they are much more difficult feedstocks for hydrodesulphurisation processes. A good residue desulphurisation catalyst requires not only high activity for desulphurisation but also good selectivity to minimise hydrogen consumption and the formation of carbonaceous and/or metal deposits.

It has now been found that the treatment of a desulphurisation catalyst with water changes the catalyst pore size distribution so as to improve residue desulphurisation performance.

According to one aspect of the present invention, therefore, there is provided a method for preparing a catalyst, suitable for the hydro-desulphurisation of hydrocarbons, comprising from 1–10% wt of an iron group metal and from 5–25% wt of a Group VIA metal (as hereinbefore defined) on a refractory support, the method comprising the step of treating the catalyst with water free from added salts.

The quantitites above are expressed as % wt elements by weight of total catalyst but the elements will normally be present as compounds, particularly oxides or sulphides. Preferred combinations are cobalt and molybdenum, nickel and molybdenum, or nickel, cobalt and molybdenum, all originally present as oxides or sulphides, and nickel tungsten sulphide. If two or more iron group metals are used the total iron group metal content remains in the range 1–10% wt.

The refractory support may be one or more oxides of elements of Groups II to IV of the Periodic Table, particularly alumina, silica, or silica-alumina. A single oxide, particularly alumina, is preferred. The alumina may contain up to 5% wt of silica or phosphate to stabilise it and/or give the required pore characteristics. An alumina support means, therefore, one with at least 95% wt of alumina.

The method of preparation of the catalyst as regards the iron group metal, the Group VIA metal and the support may follow standard practice. Thus the metals may be added by simultaneous or sequential impregnation with suitable salt solutions, followed by drying, calcination, and, if necessary, pre-sulphiding.

The treatment with water is preferably carried out after the iron group metal compound and the Group VIA metal compound have been added and calcined.

The treatment may be carried out in the liquid phase at ambient or elevated temperature, e.g. 20°–100° C, including reflux, for a period between 5 and 500 hours, preferably between 20 and 100 hours.

After treatment, the catalyst should be dried and calcined as before.

According to another aspect of the invention there is provided a process for the hydrocatalytic desulphurisation of hydrocarbon fractions containing sulphur compounds which process comprises contacting the fraction at elevated temperature and pressure in the presence of hydrogen with a catalyst comprising from 1–10% wt of an iron group metal and from 5–25% wt of a Group VIA metal (as hereinbefore defined) on a refractory support, all weights being by weight of total catalyst, the catalyst having been treated with water free from added salts, as hereinbefore described.

The feedstocks may be sulphur containing hydrocarbon fractions, particularly petroleum fractions. They may be atmospheric distillate fractions, e.g., fractions boiling in the range 50°–350° C, but, preferably, they contain at least 25% wt of material boiling above 350° C and more particularly at least 25% wt of material boiling above 550° C. Particularly preferred feedstocks are atmospheric and vacuum residues boiling above 350° C although wax distillates boiling within the range 350°–550° C and crude oils may also be treated. Depending on the original crude oil source the feedstocks may contain 1–8% wt sulphur, 0–1% wt nitrogen, 10–1,000 p.p.m. by weight of metals and 1–20% wt of asphaltenes. The preferred feedstocks are straight run fractions, but products from previous treatment processes may also be used, e.g., visbreaker distillates or residues, and cat cracker cycle oils.

The desulphurisation process conditions may be chosen from the following ranges:

| Distillates | | Broad Range | Preferred Range |
|---|---|---|---|
| Temperature | ° C | 150 – 500 | 250 – 430 |
| Pressure | bars (ga) | 5 – 250 | 10 – 170 |
| Liquid Space velocity | v/v/hr | 1 – 20 | 2 – 16 |
| Hydrogen Gas Rate | m³ of H$_2$/m³ feed | 20 – 2000 | 25 – 250 |

Atmospheric and Vacuum Residues

| | | Broad Range | Preferred Range |
|---|---|---|---|
| Temperature | ° C | 250 – 500 | 300 – 440 |
| Pressure | bars (ga) | 30 – 400 | 50 – 250 |
| Liquid Space Velocity | v/v/hr | 0.1 – 10 | 0.2 – 3.0 |
| Hydrogen Gas Rate | m³ of H$_2$/m³ feed | 180 – 3,600 | 500 – 1,800 |

These variables may be adjusted in known manner depending on the level of desulphurisation required.

In residue desulphurisation, particular attention has been paid in recent years to the physical, as well as the chemical, characteristics of the catalysts used. Microporous catalysts, i.e., catalysts with a preponderance of pores below 300 A diameter, combine good desulphurisation activity with reasonable life because there is less tendency for these microporous catalysts to pick up metals and asphaltenes present in the feed. Catalysts containing pores above 300A diameter tend to pick up metals. This may be desirable in a preliminary reactor or guard chamber but is less desirable in a main desulphurisation chamber.

We have now discovered that water treatment of a finished extrudate can convert a catalyst of poor physical characteristics to one of good characteristics. Therefore, a standard catalyst preparation can be used, without especially stringent control of pore size distribution at all stages in the manufacture. Subsequent treatment in a simple step to produce a catalyst with the preferred physical characteristics is now possible.

Catalysts having differing proportions of micropores (and hence differing metal removal characteristics) have been treated with water, as will be shown in more detail hereafter, and improved results have been obtained in all cases.

The invention is illustrated by the following examples and FIGS. 1-5 of the accompanying drawings.

EXAMPLE 1

Catalyst A, a commercially available CoMo-alumina catalyst in the form of 1/16 inch extrudates, was subjected to a variety of water-treatments as follows:

Catalyst B, 100 g of catalyst A was left standing in 150 ml deionised water at ambient temperature (20°-25° C) for 24 hours. The extrudates were recovered by filtration then dried at 120° C for 16 hours and calcined at 500° C for 2 hours.

Catalyst C, 100 g of catalyst A was refluxed with 500 ml deionised water for 24 hours. The recovered extrudates were dried and then calcined as described above.

Catalyst D, this was prepared as catalyst C except that the time of refluxing was increased to 72 hours.

Analytical data on catalysts A to D are given below:

These results show that water-treatment has decreased the micropore volume (300 A) by about 77 percent at ambient temperature and by about 90 percent at reflux. Water-treatment has also increased the micropore volume (300 A) by about 6.5 percent at ambient temperature and by about 11 percent at reflux on a weight basis. In addition, temperature is seen to alter the distribution of the micropore volume increase. At ambient temperature, the increase is spread over the whole range of micropore diameters but particularly in the range 150–300 A. At reflux, however, the increase is predominantly in the 0–150 A range and, as the time of reflux is increased, the pore volume in the 150–300 A range is actually decreased.

EXAMPLE 2

Two further commercially-available CoMo-alumina catalysts were water-treated to further investigate the time of treatment and also the effects when totally different base catalysts were treated.

Catalyst E, a commerical catalyst very similar to catalyst A, was refluxed with water for three days to produce catalyst F. A similar treatment lasting five days was used to prepare catalyst G.

Catalyst H, a commercial catalyst with a very high pore volume, particularly in pores of greater than 300 A diameter, was refluxed with water for five days to give catalyst J.

Analytical data on catalysts E to J are given overleaf.

|  | Catalyst E | Catalyst F | Catalyst G | Catalyst H | Catalyst J |
|---|---|---|---|---|---|
| Water-treatment details | None | 3 days at Reflux | 5 days at Reflux | None | 5 days at Reflux |
| CoO (stable at 550° C) % wt | 3.7 | 3.5 | 3.6 | 3.8 | 3.6 |
| MoO$_3$ (stable at 550° C) % wt | 13.4 | 13.5 | 13.2 | 15.2 | 15.0 |
| BET surface area m$^2$/g | 336 | 338 | 371 | 231 | 288 |
| Total pore volume ml/g | 0.678 | 0.606 | 0.630 | 1.039 | 0.711 |
| Distribution of Pore Vol |  |  |  |  |  |
| 0–60 A diameter ml/g | 0.299 | 0.312 | 0.321 | 0.192 | 0.240 |
| 60–100 A diameter ml/g | 0.109 | 0.126 | 0.141 | 0.133 | 0.100 |
| 100–150 A diameter ml/g | 0.069 | 0.079 | 0.084 | 0.199 | 0.108 |
| 150–300 A diameter ml/g | 0.087 | 0.078 | 0.073 | 0.162 | 0.083 |
| >300 A ml/g | 0.114 | 0.011 | 0.011 | 0.433 | 0.180 |

These results confirm the trends observed in Example 1, i.e., that as the time of refluxing is increased, the increase in micropore volume is found in the range 0–150 A and that above 150 A, pore volume has decreased.

|  | Catalyst A | Catalyst B | Catalyst C | Catalyst D |
|---|---|---|---|---|
| Water-treatment details | None | 24 h at Ambient | 24 h at Reflux | 72 h at Reflux |
| CoO (stable at 550° C)%wt | 4.1 | 3.8 | 3.9 | 3.9 |
| MoO$_3$(stable at 550° C)%wt | 13.5 | 13.5 | 13.9 | 13.9 |
| BET surface area m$^2$/g | 334 | 336 | 360 | 363 |
| Total pore volume ml/g | 0.629 | 0.584 | 0.597 | 0.593 |
| Distribution of pore volume |  |  |  |  |
| 0–60 A diameter ml/g | 0.301 | 0.307 | 0.331 | 0.336 |
| 60–100 A diameter ml/g | 0.103 | 0.115 | 0.122 | 0.122 |
| 100–150 A diameter ml/g | 0.062 | 0.066 | 0.072 | 0.071 |
| 150–500 A diameter ml/g | 0.060 | 0.072 | 0.063 | 0.053 |
| >300 A diameter ml/g | 0.103 | 0.024 | 0.009 | 0.011 |

EXAMPLE 3

Three of the catalysts from Example 1 were used to process Kuwait atmospheric residue in a standard activity test. The test procedure consisted of three stages:

a. Presulphiding

| Pressure | bar (ga) | 34.5 |
|---|---|---|
| LHSV | v/v/h | 1.0 |
| Hydrogen recycle rate | m³/m³ | 180 |
| Initial catalyst temperature | °C | 140 |

Feedstock — gas oil containing added $CS_2$ to give 3 percent weight sulphur. The catalyst temperature was raised from 140° to 320° C at 20° C per hour and held at 320° C for 1 hour.

b. Accelerated Ageing Test

The feedstock was changed to Kuwait atmospheric residue and the operating conditions were altered as follows:

| Pressure | bar (ga) | 103 |
|---|---|---|
| Space velocity | v/v/h | 1.0 |
| Hydrogen recycle rate | m³/m³ | 840 |
| Catalyst temperature | °C | 400 |
| Duration of test | h | 250 | c. Temperature Response Test

With the same residue feedstock, the operating conditions were altered as follows:

| Pressure | bar (ga) | 103 |
|---|---|---|
| Space velocity | v/v/h | 0.5 |
| Hydrogen recycle rate | m³/m³ | 840 |
| Catalyst temperature | °C | 370; 395 and 420 |
| Duration of test | h | 24 at each temperature |

The Kuwait atmospheric residue had the following properties:

| Sulphur | % wt | 3.87 |
|---|---|---|
| Nitrogen | ppm wt | 2070 |
| Nickel | ppm wt | 16 |
| Vanadium | ppm wt | 49 |
| Sodium | ppm wt | 28 |
| Asphaltenes | % wt | 2.2 |
| Conradson carbon residues | % wt | 9.8 |

The three catalysts evaluated using the above test procedure were:

Catalyst A — commercial CoMo alumina
Catalyst B — 1 day water-treatment at ambient of Catalyst A
Catalyst C — 1 day water-treatment at reflux of catalyst A.

FIG. 1 shows the results obtained from the accelerated ageing tests. Water-treatment is seen to have reduced the initial decay rate with the catalyst prepared under reflux (catalyst C) being better than that prepared at ambient temperature (catalyst B).

Results from the temperature response tests were processed to give desulphurisation, demetallation and asphaltenes removal. FIGS. 2 and 3 show the results obtained. Water-treatment is seen to increase the selectivity for desulphurisation relative to demetallation and asphaltenes removal. Once again, catalyst C is better than catalyst B.

Thus, the modified pore size distribution obtained after water-treatment is shown to reduce catalyst decay rate. This can be attributed to increase selectivity for desulphurisation relative to potential catalyst poisoning reactions such as demetallation and asphaltenes removal.

EXAMPLE 4

Two of the catalysts from Example 2 were used to desulphurise atmospheric residue derived from Iranian Heavy crude oil. The test procedure consisted of two stages:

a. Presulphiding

| Pressure | bar (ga) | 34.5 |
|---|---|---|
| LHSV | v/v/h | 1.6 |
| Hydrogen recycle rate | m³m³ | 170 |
| Initial catalyst temperature | °C | 140 |

Feedstock-gas oil containing added $CS_2$ to give 3 percent weight sulphur. The catalyst temperature was raised from 140° to 320° C at 30° C/hour and held at 320° C for 1 hour.

b. Metals Tolerance Test

Iranian Heavy atmospheric residue was processed at the following conditions:

| Pressure | bar (ga) | 103 |
|---|---|---|
| LHSV | v/v/h | 1.5 |
| Hydrogen recycle rate | m³/m³ | 840 |
| Catalyst temperature | °C | 420 |

The test was continued until the level of desulphyrisation fell to 52 percent weight.

The Iranian Heavy atmospheric residue had the following composition:

| Sulphur | % wt | 2.63 |
|---|---|---|
| Nickel | ppm wt | 48 |
| Vanadium | ppm wt | 146 |
| Nitrogen | ppm wt | 4200 |
| Conradson carbon residues | 5 wt | 10.0 |
| Asphaltenes | % wt | 3.7 |

The two catalysts used to process this feedstock were:

Catalyst E — commerical CoMo -alumina
Catalyst G — 5 day water-treatment at reflux FIG. 4 shows the metals tolerance test results. Water-treatment is once again seen to produce a considerably reduced catalyst decay rate. The life of the commercial catalyst has been increased by 35 percent after refluxing with water for five days. FIG. 5 shows that water-treatment has increased the selectivity for desulphurisation relative to demetallation. This selectivity change can be attributed to the modified pore size distribution.

We claim:

1. In a method for preparing a catalyst having increased micropore volume for pore diameters below 300 Angstroms and decreased micropore volume for pore diameters above 300 Angstroms, suitable for the hydrodesulphurisation of hydrocarbons, wherein said catalyst comprises from 1–10% by weight of an iron group metal compound and from 5–25% by weight of a Group VIA metal compound on a refractory support, selected from the group consisting of alumina, silica and silica-alumina and wherein said method includes the steps of impregnating the support with the iron group metal compound and the Group VIA metal compound, drying and calcining the impregnated support, the invention comprising, the step of treating the catalyst after calcination with water free from added salts, in the liquid phase, at a temperature in the range 20°–100° C and at atmospheric pressure.

2. A method according to claim 1 wherein the treatment is carried out for a length of time between 5 and 500 hours.

3. A method according to claim 2 wherein the treatment is carried out for a length of time between 20 and 100 hours.

* * * * *

UNITED STATES PATENT AND TRADEMARK OFFICE
CERTIFICATE OF CORRECTION

PATENT NO. : 4,035,261
DATED : July 12, 1977
INVENTOR(S) : John David Hargrove and Graham Keith Hilder It is certified that error appears in the above-identified patent and that said Letters Patent are hereby corrected as shown below:

Col. 6, line 44, should read as follows:

--Conradson carbon residues    % wt    10.0--

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*